United States Patent
Damyanov et al.

(10) Patent No.: US 11,442,902 B2
(45) Date of Patent: Sep. 13, 2022

(54) SHARD-LEVEL SYNCHRONIZATION OF CLOUD-BASED DATA STORE AND LOCAL FILE SYSTEM WITH DYNAMIC SHARDING

(71) Applicant: Nasuni Corporation, Boston, MA (US)

(72) Inventors: Georgi Damyanov, Winchester, MA (US); Yuyan Zhang, Watertown, MA (US)

(73) Assignee: Nasuni Corporation, Boston, MA (US)

( * ) Notice: Subject to any disclaimer, the term of this patent is extended or adjusted under 35 U.S.C. 154(b) by 111 days.

(21) Appl. No.: 16/014,518

(22) Filed: Jun. 21, 2018

(65) Prior Publication Data
US 2019/0392051 A1   Dec. 26, 2019

(51) Int. Cl.
| G06F 16/00 | (2019.01) |
| G06F 16/178 | (2019.01) |
| G06F 16/11 | (2019.01) |
| G06F 16/182 | (2019.01) |
| G06F 16/27 | (2019.01) |
| G06F 16/18 | (2019.01) |
| G06F 16/22 | (2019.01) |

(52) U.S. Cl.
CPC ......... *G06F 16/178* (2019.01); *G06F 16/128* (2019.01); *G06F 16/182* (2019.01); *G06F 16/1873* (2019.01); *G06F 16/2246* (2019.01); *G06F 16/278* (2019.01)

(58) Field of Classification Search
CPC .. G06F 16/178; G06F 16/182; G06F 16/1873; G06F 16/2246; G06F 16/278; G06F 16/128

USPC .......................................................... 707/610
See application file for complete search history.

(56) References Cited

U.S. PATENT DOCUMENTS

| 5,784,554 A * | 7/1998 | Hsiung | G06F 11/3409 714/45 |
| 2004/0111608 A1* | 6/2004 | Oom Temudo de Castro | H04L 9/3247 713/156 |
| 2005/0065986 A1* | 3/2005 | Bixby | G06F 16/128 |
| 2010/0191774 A1* | 7/2010 | Mason, Jr. | G06F 11/1446 707/797 |
| 2015/0234895 A1* | 8/2015 | Erdogan | G06F 16/24542 707/714 |
| 2016/0154817 A1* | 6/2016 | Mason, Jr. | G06F 16/1827 707/704 |

* cited by examiner

*Primary Examiner* — Monica M Pyo
(74) *Attorney, Agent, or Firm* — David H. Judson

(57) ABSTRACT

An operations server synchronizes updates to a cloud-based shared versioned file system. The shared versioned file system includes directories and sub-directories that are divided into shards. The operations server coordinates requests from local filer servers, each running a respective local version of the shared versioned file system, to update a shard in the cloud-based shared versioned file system. The operations server can provide a global lock on the shard to a local filer server before it updates the shard in the cloud-based shared versioned file system. Preferably, shards are sized dynamically based on the number of entries in the directories associated therewith.

9 Claims, 17 Drawing Sheets

90

| Inode | Shard | Update? | Event Number | |
|---|---|---|---|---|
| 2 | S1 | Yes | 100 | ← Filer 720 |
| 4 | S2 | Yes | 101 | |
| 10 | S1 | Yes | 102 | ← Filer 710 |
| 10 | S3 | Yes | 103 | |
| 250 | S5 | Yes | 104 | |
| 150 | S2 | Yes | 105 | |

Fig. 9

/inodes/1/S1/now ("latest" = "1")
/inodes/1/S1/1

1200

```
<manifest>
<inode>1</inode>
<shard>1</shard>
<contents>
 <direntry>
  <inode>100</inode>
  <name>file1.txt</name>
  <stbuf>
   <nlink>1</nlink>
   <size>1024</size>
  </stbuf>
 </direntry>
</contents>
</manifest>
```

/inodes/1/S1/now ("latest" = "2")
/inodes/1/S1/2

```
<manifest>
<inode>1</inode>
<shard>1</shard>
<contents>
 <direntry>
  <inode>100</inode>
  <name>file1.txt</name>
  <stbuf>
   <nlink>1</nlink>
   <size>1024</size>
  </stbuf>
 </direntry>
 <direntry>
  <inode>101</inode>
  <name>file2.txt</name>
  <stbuf>
   <nlink>1</nlink>
   <size>2048</size>
  </stbuf>
 </direntry>
</contents>
</manifest>
```

Fig. 13

```
/inodes/101/now ("latest" = "1")
/inodes/101/1

<manifest>
<inode>101</inode>
<chunks>
  <chunk
    offset="0" length="1024"
    handle="c1"/>
  <chunk
    offset="1024" length="1024"
    handle="c2"/>
</chunks>
</manifest>
```

Fig. 14

SHARD-LEVEL SYNCHRONIZATION OF CLOUD-BASED DATA STORE AND LOCAL FILE SYSTEM WITH DYNAMIC SHARDING

TECHNICAL FIELD

The present application relates generally to data storage, and more particularly to synchronizing data stored in a cloud based network-attached file system at the data shard level or sub-directory level.

BACKGROUND

It is known to provide an interface between an existing local file system and a data store (e.g., a "write-once" store) to provide a "versioned" file system. The versioned file system comprises a set of structured data representations, such as XML. In a representative embodiment, at a first time, the interface creates and exports to a data store a first structured data representation corresponding to a first version of the local file system. The first structured data representation is an XML tree having a root element, a single directory (the "root directory") under the root element, zero or more directory elements associated with the root directory, and zero or more elements (such as files) associated with a given directory element. Each directory in turn can contain zero or more directories and zero or more files. Upon a change within the file system (e.g., file creation, file deletion, file modification, directory creation, directory deletion and directory modification), the interface creates and exports a second structured data representation corresponding to a second version of the file system. The second structured data representation differs from the first structured data representation up to and including the root element of the second structured data representation. Thus, the second structured data representation differs from the first structured data representation in one or more (but not necessarily all) parent elements with respect to the structured data element in which the change within the file system occurred. The interface continues to generate and export structured data representations to the data store, preferably at given "snapshot" times when changes within the file system have occurred. The data store comprises any type of back-end storage device, system or architecture. In one embodiment, the data store comprises one or more cloud storage service providers. As necessary, a given structured data representation is then used to retrieve an associated version of the file system. In this manner, the versioned file system only requires write-once behavior from the data store to preserve its complete state at any point-in-time.

A problem with the above system is that a change to any file or directory in the file system causes a new version of each parent directory all the way up to the root. This causes additional processing time and resources to create each new "version" of the file system. Also, to determine what file or directory has changed between versions of the file system, the entire directory structure needs to be "walked." In a large file system with a large user base, the processing overhead required to maintain this directory structure is significant. It would be desirable to create versions of a more granular portion of a file system without having to create a snapshot of the entire file system.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

IN THE DRAWINGS

For a more complete understanding of the disclosed subject matter and the advantages thereof, reference is now made to the following descriptions taken in conjunction with the accompanying drawings, in which:

FIG. 9 illustrates a table of updates to a shared versioned file system maintained by the filer server;

FIG. 12 is a simplified illustration of a representative shard in an embodiment;

FIG. 13 is a simplified illustration of the representative shard from FIG. 12 after an update in one embodiment;

FIG. 14 is a simplified illustration of a representative directory entry in the representative shard of FIG. 13;

DETAILED DESCRIPTION

Figure 1:
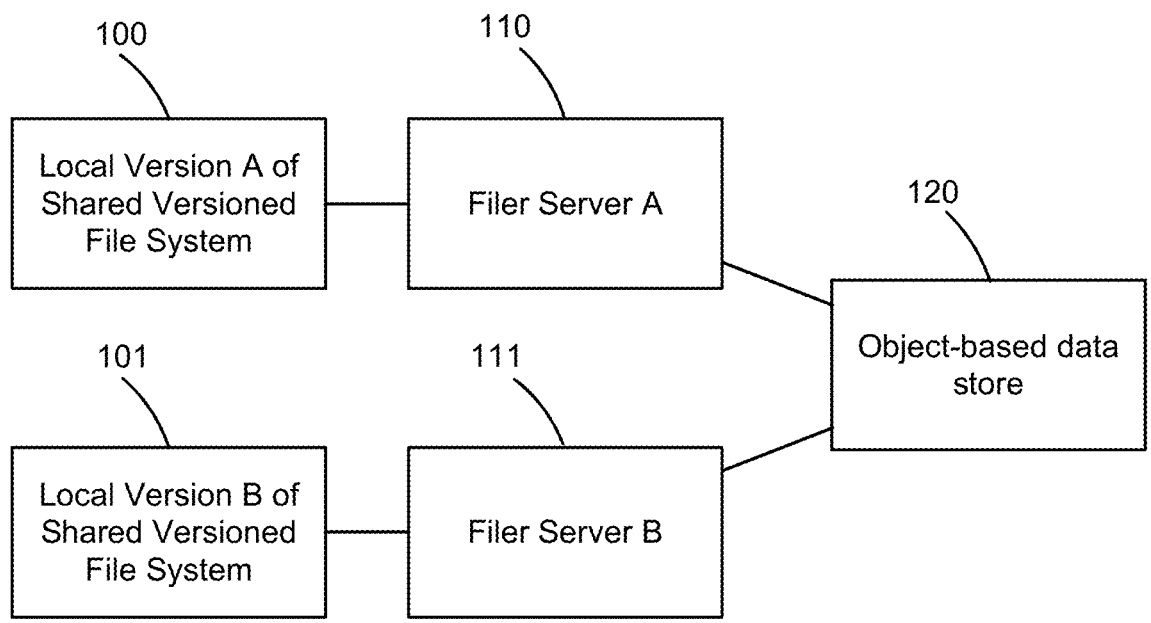
FIG. 1 is a block diagram illustrating how a shared versioned file system interfaces a local version of the shared versioned file system to an object-based data store.

FIG. 1 illustrates a simplified system 10 for providing a shared versioned file system. The system 10 includes local versions 100, 101 of the shared versioned file system and an object-based data store 120. Although not meant to be limiting, the object-based store 120 can be a "write-once" store and may comprise a "cloud" of one or more storage service providers. Each interface or filer server 110, 111 exposes a respective local version 100, 101 of a "shared versioned file system" that only requires write-once behavior from the object-based data store 120 to preserve substantially its "complete" state at any point-in-time. As used herein, the phrase "point-in-time" should be broadly construed, and it typically refers to periodic "snapshots" of the local version of the shared versioned file system or periodic snapshots of any updates to the local version of the shared versioned file system (e.g., once every "n" minutes). The value of "n" and the time unit may be varied as desired. Each filer server 100, 101 provides for a local version 100, 101 of the shared versioned file system that has complete data integrity to the cloud. In particular, this solution circumvents the problem of a lack of reliable atomic object replacement in cloud-based object repositories. The filer servers 100, 101 are not limited for use with a particular type of back-end data store. When the filer servers 100, 101 are positioned in "front" of data store 120, the filer servers 100, 101 have the effect of turning whatever is behind it into respective local versions of a "shared versioned file system" ("SVFS"). The SVFS is a construct that is distinct from the filer server itself, and the SVFS continues to exist irrespective of the state or status of the filer server (from which it may have been generated). Moreover, the SVFS is self-describing, and it can be accessed and managed separately from the back-end data store, or as a component of that data store. Thus, the SVFS (comprising a set of structured data representations) is location-independent. In one embodiment, the SVFS resides within a single storage service provider (SSP) although, as noted above, this is not a limitation. In another embodiment, a first portion of the SVFS resides in a first SSP, which a second portion resides in a second SSP. Generalizing, any given SVFS portion may reside in any given data store (regardless of type), and multiple VFS portions may reside across multiple data store(s). The SVFS may reside in an "internal" storage cloud (i.e. a storage system internal to an enterprise), an external storage cloud, or some combination thereof.

The interface or filer server 104 can be implemented as a machine. A representative implementation is the NASUNI® Filer, available from Nasuni Corporation of Massachusetts. Thus, for example, typically the filer server 104 is a rack-mounted server appliance comprising of hardware and software. The hardware typically includes one or more processors that execute software in the form of program instructions that are otherwise stored in computer memory to comprise a "special purpose" machine for carrying out the functionality described herein. Alternatively, the filer server 104 is implemented as a virtual machine or appliance (e.g., via VMware®, or the like), as software executing on a server, or as software executing on the native hardware resources of the local version of the SVFS. The filer server 104 serves to transform the data representing the local version of the SVFS (a physical construct) into another form, namely, a shared versioned file system comprising a series of structured data representations that are useful to reconstruct the shared versioned file system to any point-in-time.

Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value, and position in the document.

The filer server 104 generates and exports to the write-once data store a series of structured data representations (e.g., XML documents) and data objects that together comprise the shared versioned file system. The structured data representations are stored in the data store 120. Preferably, the XML representations are encrypted before export to the data store. The transport may be performed using known techniques. In particular, REST (Representational State Transfer) is a protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

Figure 2:
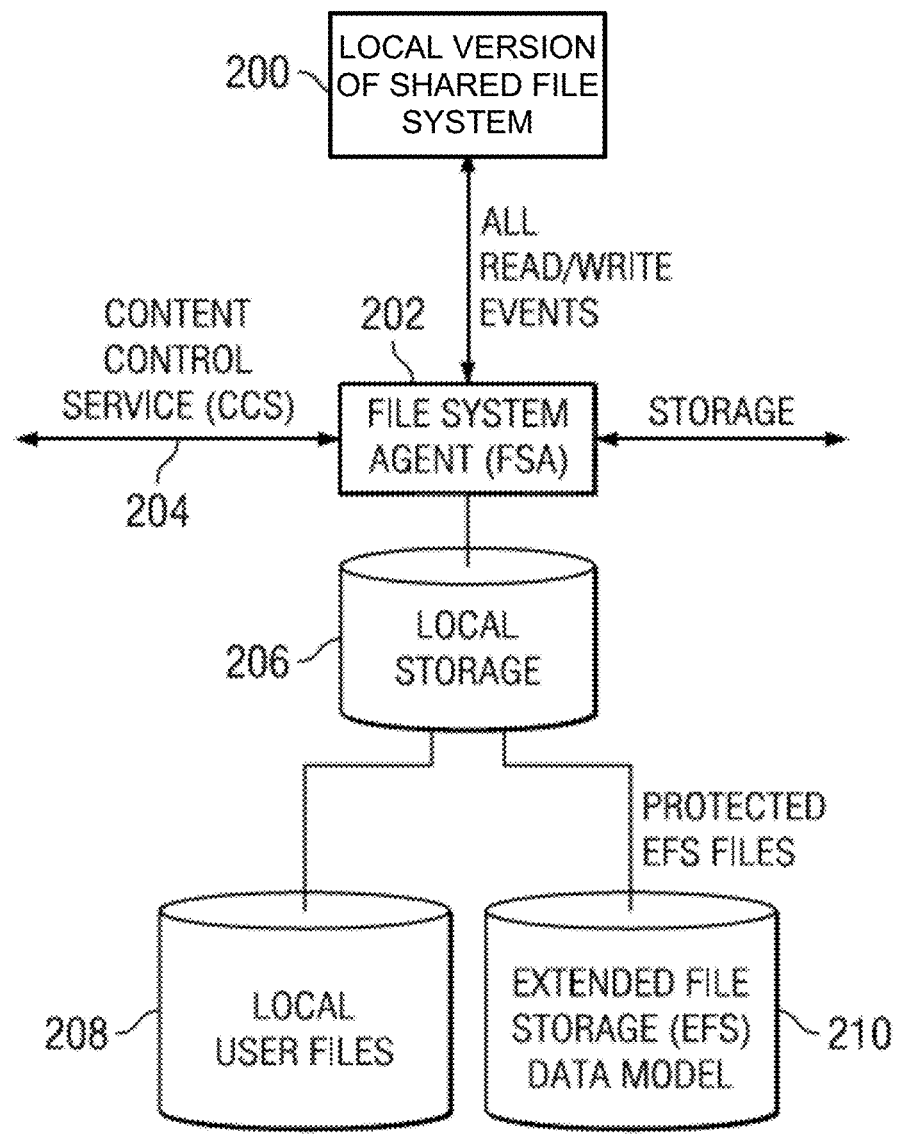
FIG. 2 is a block diagram of a representation implementation of a portion of the interface shown in FIG. 1.

FIG. 2 is a block diagram of a representative implementation of how the interface or filer server 110/111 captures all (or given) read/write events from a local version of shared versioned file system 200. In this example implementation, the interface comprises a file system agent (FSA) 202 that is positioned within a data path between a local version of shared versioned file system 200 and its local storage 206. The file system agent 202 has the capability of "seeing" all (or some configurable set of) read/write events output from the local file system. The interface/filer server also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local version of the shared versioned file system stores local user files (the data) in their native form in cache 208. Reference numeral 210 represents that portion of the cache that stores pieces of metadata (the structured data representations, as will be described) that are exported to the back-end data store (e.g., the cloud).

Figure 3:
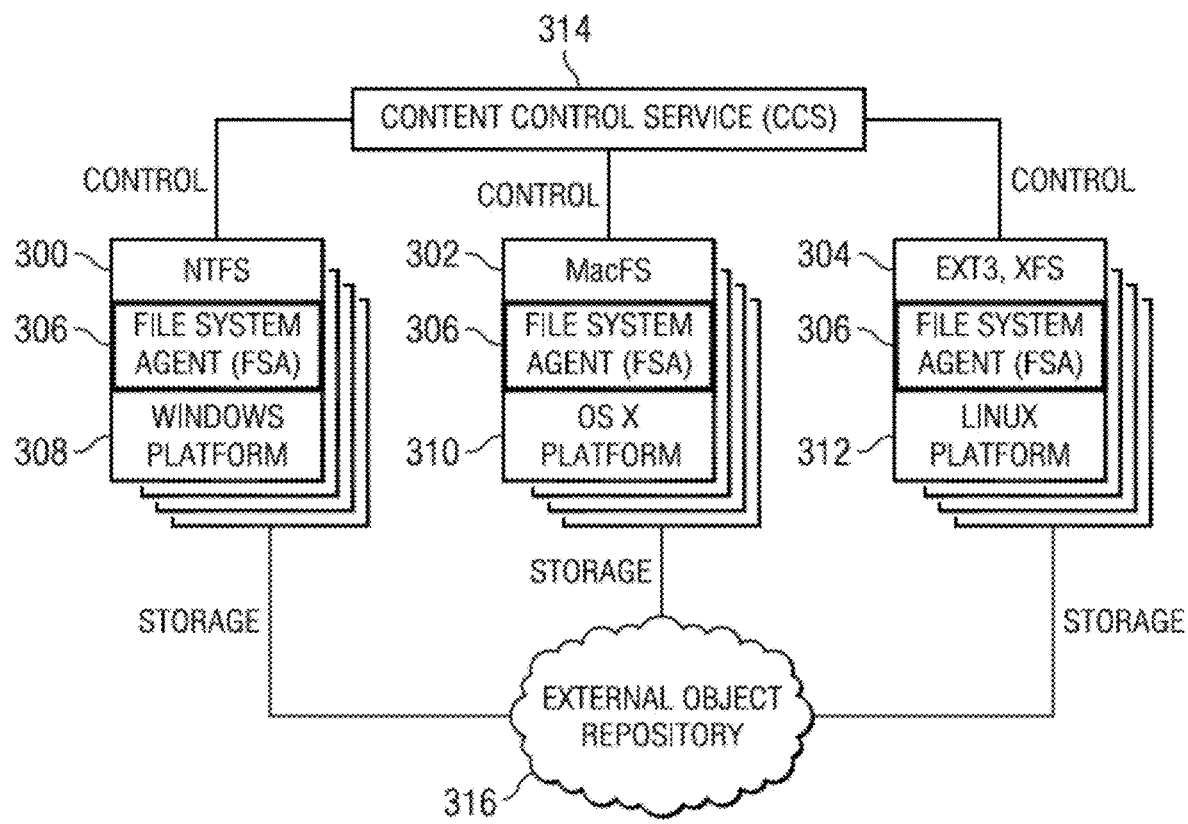
FIG. 3 is a more detailed implementation of the interface where there are a number of local versions of the shared versioned file system of different types.

FIG. 3 is a block diagram illustrating how the interface may be used with different types of local file system architectures. In particular, FIG. 3 shows the CCS (in this drawing a Web-based portal) controlling three (3) FSA instances. Once again, these examples are merely representative and they should not be taken to limit the invention. In this example, the file system agent 306 is used with three (3) different local versions of the shared versioned file system: NTFS 300 executing on a Windows operating system platform 308, MacFS (also referred to as "HFS+" (HFSPlus)) 302 executing on an OS X operating system platform 310, and EXT3 or XFS 304 executing on a Linux operating system platform 312. These local versions of the shared versioned file system may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
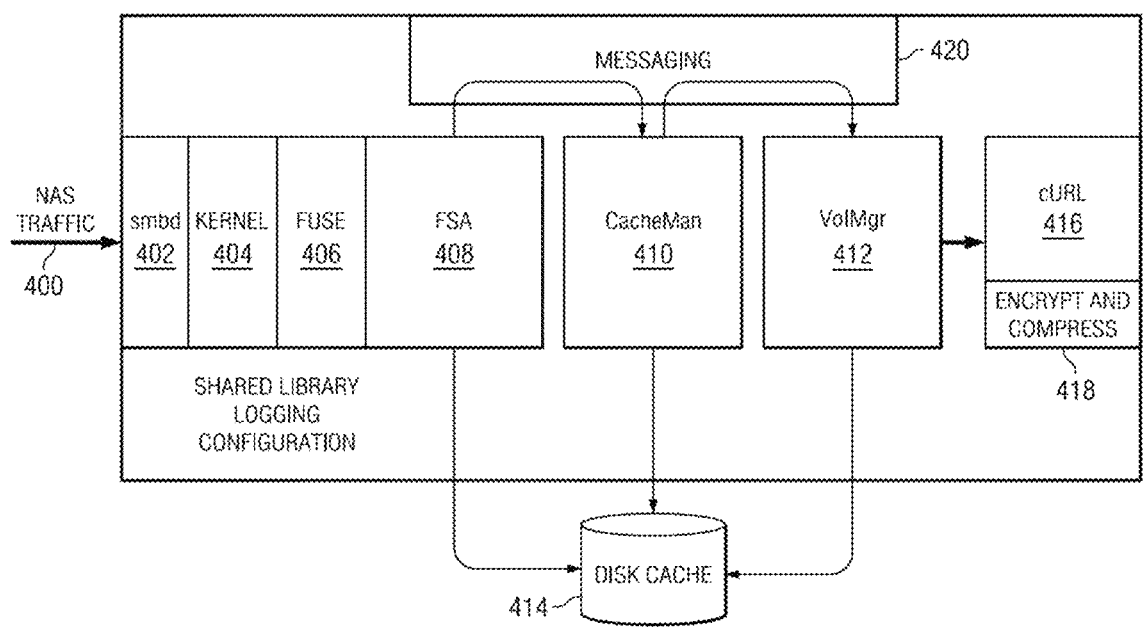
FIG. 4 illustrates a filer server implemented as an appliance within a local processing environment.

FIG. 4 illustrates the interface/filer server implemented as an appliance within a local processing environment. In this embodiment, the version of 400 for the local version of the shared versioned file system is received over Ethernet and represented by the arrow identified as "NAS traffic." That traffic is provided to smbd layer 402, which is a SAMBA file server daemon that provides CIFS (Window-based) file sharing services to clients. The layer 402 is managed by the operating system kernel 404 is the usual manner. In this embodiment, the local version of the shared versioned file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface or filer server described herein to maintain a local cache of the data structures (the structured data representations) that comprise the shared versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the shared versioned file system) through a transport mechanism 416 such as cURL. cURL is a library and command line tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

The interface/filer server shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The shared versioned file system may have its own associated object-based data store, but this is not a requirement, as its main operation is to generate and manage the structured data representations that comprise the shared versioned file system. The cloud preferably is used just to store the structured data representations, preferably in a write-once manner, although the "shared versioned file system" as described herein may be used with any back-end data store and can be a write-many data store.

As described above, the file system agent 408 is capable of completely recovering from the cloud (or other store) the state of the local version of the shared versioned file system and providing immediate file system access (once FSA metadata is recovered). The FSA can also recover to any point-in-time for the whole shared versioned file system, a directory and all its contents, a portion of a directory (e.g., a shard) and its contents, a single file, or a piece of a file. These and other advantages are provided by the "shared versioned file system" of this disclosure, as it now described in more detail below.

Figure 5:
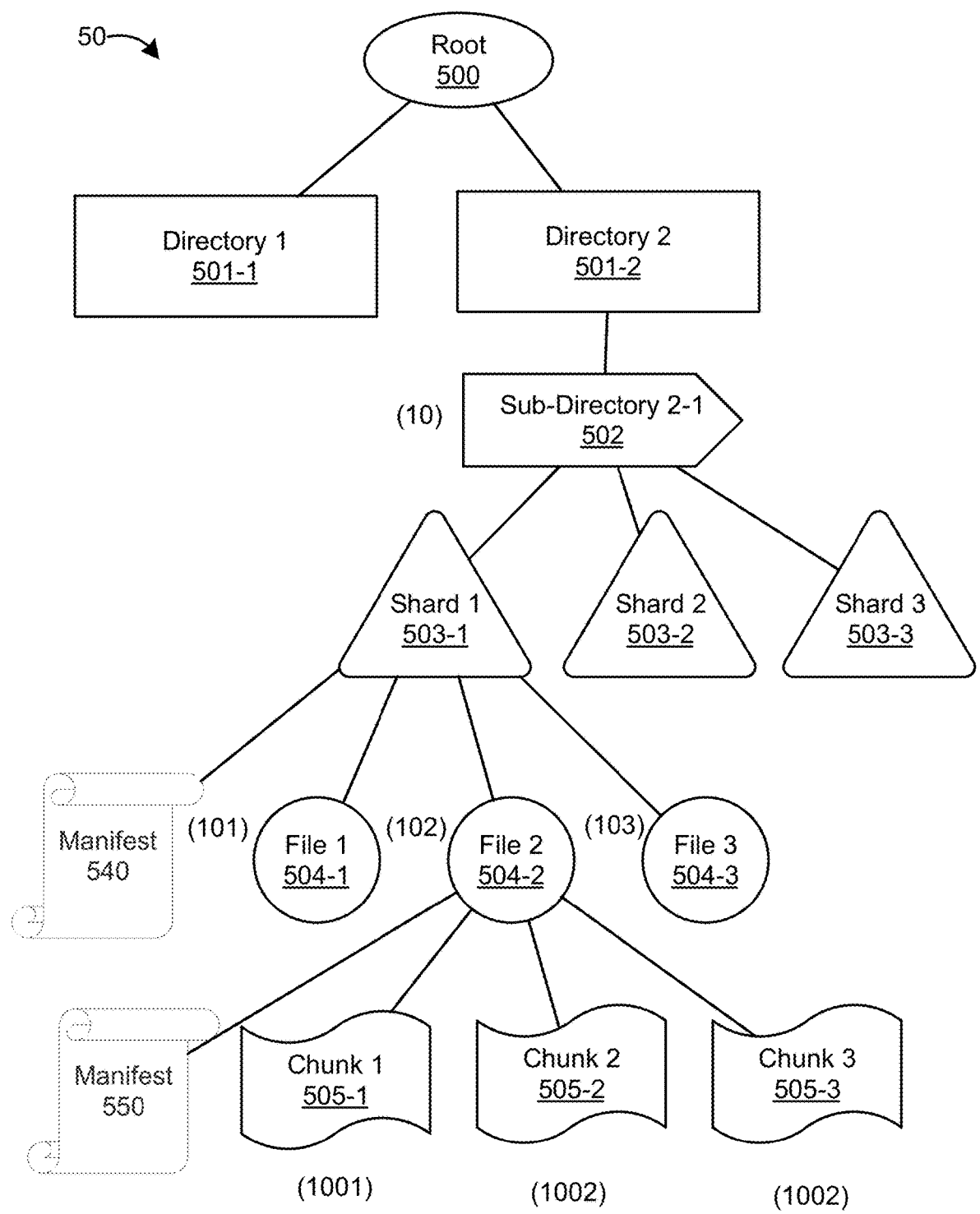
FIG. 5 is a block diagram of the architecture of a shared versioned file system according to an embodiment.

FIG. 5 is a block diagram of the architecture of a shared versioned file system 50 according to an embodiment. The architecture 50 includes a root-level directory 500 and first-level directories 500-1, 500-2. First level directory 500-2 includes sub-directory 2-1 502, which is divided into shards 1, 2, and 3 (corresponding to reference numbers 503-1, 503-2, 503-3) (in general, shard 503). Each shard 503 is a portion of sub-directory 2-1 502. As an example, files 1, 2, and 3 (corresponding to reference numbers 504-1, 504-2, and 504-3) in sub-directory 2-1 502 are assigned to shard 1 503-1. Shard 2 503-2 and shard 3 503-3 can also include files and/or metadata that belong to sub-directory 2-1 502.

Each file 504 is divided into one more chunks, such as chunks 1, 2, 3 (corresponding to reference numbers 504-1, 504-2, 504-3) (in general, chunk 504) of file 2 504-2. An example of dividing files into chunks can be found in U.S. Pat. No. 8,566,362, entitled "Method and System for Versioned File System Using Structured Data Representations," assigned to the present Applicant, which is incorporated herein by reference. Each directory/sub-directory, file, and chunk of shared versioned file system 50 can be represented by an inode. Example inode numbers for the following components of shared versioned file system 50 are illustrated in parentheticals: sub-directory 2-1 502 (10), file 1 504-1 (101), file 2 504-2 (102), file 3 504-3 (103), and chunk 1 505-1 (1001). Additional inode numbers are illustrated in FIG. 5.

Shard 503 can have an arbitrary number of files and/or metadata from sub-directory 2-1 502. In addition, or in the alternative, shard 503 can have a maximum number of files and/or metadata, for example to provide an increased size (horizontally and/or vertically) of the shared versioned file system.

Each shard 503 has a manifest that identifies the files (by inode number) assigned to that shard. For example, manifest 540 of shard 1 503-1 identifies inodes 101, 102, and 103. The manifest 540 also includes metadata about each inode, such as the version of the shard in which the inode (file) was created and the version of the shard in which the inode (file) was last modified. The manifest can also include a flag or bit to indicate whether any component of the shard has been modified, including the manifest itself.

In addition, each file 504 has a manifest that identifies the chunks (by inode number) that make up the data of the file. For example, manifest 550 of file 2 504-2 identifies inodes 1001, 1002, and 1003. The manifest also includes metadata about each inode, such as the relationship or offset between each inode. The manifest can also include a flag or bit to indicate whether any component of the file has been modified, including the manifest itself.

Figure 6:
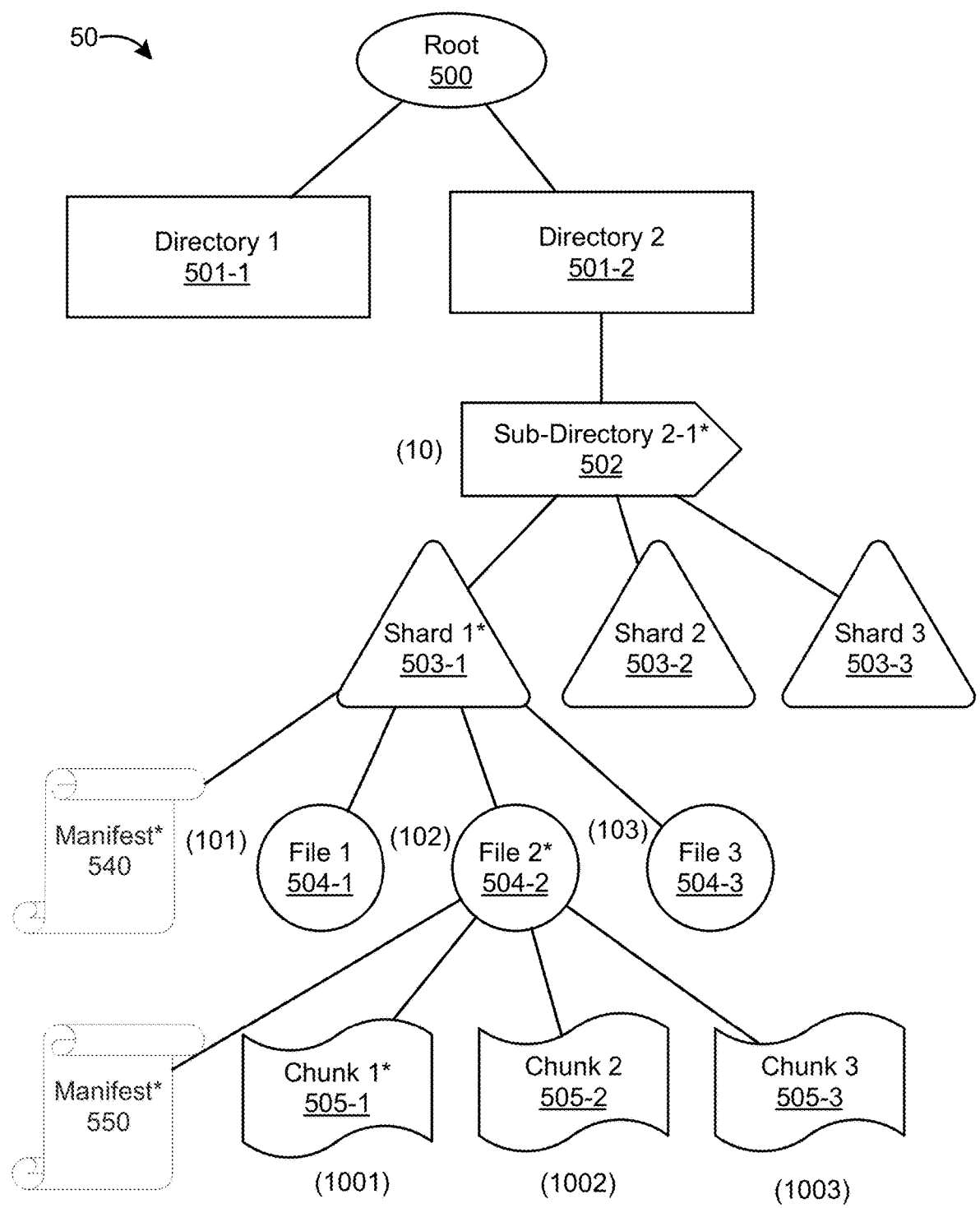
FIG. 6 illustrates the portion of the tree (as shown in FIG. 5) after a change to the contents of a file has occurred in the local version of the shared versioned file system.

FIG. 6 is a block diagram of the architecture of the shared versioned file system 50 after a change to chunk 1 505-1 in file 2 504-2. As illustrated by the asterisks in FIG. 6, the change to chunk 1*505-1 propagates to file 2*504-2. In other words, the modification to chunk 1*505-1 causes file 2*504-2 to appear as modified or "dirty." The modified or dirty file 2*504-2 causes shard 1*503-1 to appear as modified, which in turn causes sub-directory 2-1*502 to appear as modified. The modification to chunk 1*505-1 does not propagate past sub-directory 2-1*502, such as to directory 2 501-2 or root 500. Thus directory 2 501-2 and root 500 appear as unmodified even if sub-directory 2-1*502 appears as modified. In general, a change to any portion of the shared versioned file system 50 only propagates to the closest directory or sub-directory level. For example, a change to shard 2 503-2 propagates to sub-directory 2-1 502 but not to directory 2 501-2 or root 500. Similarly, a change to sub-directory 2-1 propagates to directory 2 501-2 but not to root 500.

By limiting the propagation of change events to the closest directory or sub-directory, shared versioned file system 50 can be synchronized more efficiently across local interfaces running respective local versions of the shared versioned file system.

As discussed above, a modification to a file or shard causes an update flag in the respective manifest to turn on, which makes the corresponding file or shard appear as modified. Using the example of FIG. 6, the modification to chunk 1*505-1 automatically causes the update flag in manifest*550 to turn on, which in turn causes file 2*504-2 to appear as modified. The modification to file 2*504-2 causes the update flag in manifest*540 to turn on, which in turn causes shard 1*503-1 to appear as modified. When shard 1*503-1 appears as modified, sub-directory 2-1*502 also appears as modified since shard 1*503-1 is a portion of sub-directory 2-1*502.

Figure 7:
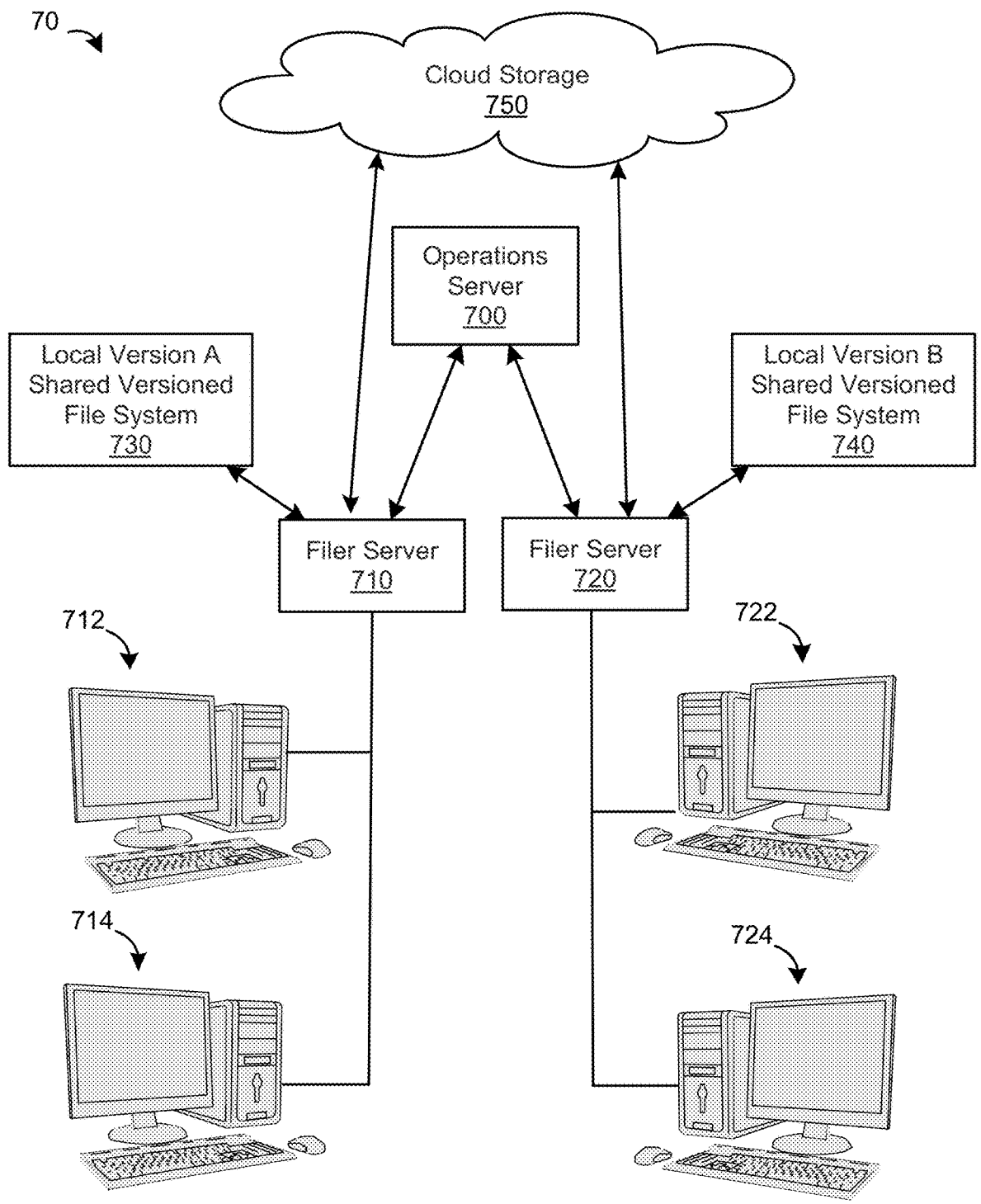
FIG. 7 is a block diagram of a system for running a shared versioned file system according to an embodiment.

FIG. 7 is a block diagram of a system 70 for running a shared versioned file system according to an embodiment. The system 70 includes operations server 700, filer servers 710, 720, and user computers 712, 714, 722, 724. Filer servers 710, 720 can be the same as FSA 202 or FSA 306 described above. Each filer server provides a respective local version of the shared versioned file system to its respective user computers. For example, Filer server 710 exposes local version A 730 of the shared versioned file system to local computers 712, 714. Likewise, Filer server 720 exposes local version B 740 of the shared versioned file system to local computers 722, 724. Local version A 730 and local version B 740 can represent the same or different versions of the shared versioned file system based on how recently the respective filer server 710, 720 have retrieved updates to the shared versioned file system from operations server 700 and cloud storage 750. If filer servers 710, 720 have retrieved updates to the shared versioned file system up to the same change event (as discussed below), local versions 730, 740 of the shared versioned file system are identical. The filer servers 710, 720 can communicate with respective user computers over a network protocol such as Network File System (NFS), Server Message Block (SMB), or Common Internet File System (CIFS). In some embodiments, the operations server 700 is a NASUNI® Operations Center, available from Nasuni Corporation of Massachusetts.

In an example of the operation of system 70, a user on user computer 712 makes a modification to a document that corresponds to file 2 504-2 (using the example of FIGS. 5 and 6, discussed above). The modification occurs in the portion of file 2 504-2 corresponding to chunk 1 505-1. Filer server 710 saves a new version of File 2 504-2 locally. The new version of file 2 504-2 includes modified manifest 540*that contains modified chunk 1*505-1 and pointers to unmodified chunk 2 505-2 and unmodified chunk n 505-n. Filer server 710 also saves a new version of shard 1 503-1 locally. The new version (e.g., version 2) of shard 1 503-1 (i.e., modified shard 1*503-1) includes a new manifest 550* that includes the inode numbers of each file in modified shard 1*503-1.

Continuing with the example of FIGS. 5 and 6, manifest 550* includes inodes 101 (unmodified file 1 504-1), 102 (modified file 2*504-2), and 103 (unmodified file 3 504-3). In addition, manifest 550* indicates that inode 102 was last modified in version 2 of shard 1 (i.e., modified shard 1*503-1). Manifest 550* also indicates that inodes 101 and 103 were last modified in version 1 of shard 1. Manifest 550* also turn the update flag on to indicate that modified shard 1*503-1 contains at least one update. By comparing the present version of shard 1 (version 2) with the version number in which each inode was last modified (inode 101 (last modified in version 1), 102 (last modified in version 2), and 103 (last modified in version 1)), the filer server 710 can determine that inode 102 includes modified data while inodes 101 and 103 do not include modified data.

In another example, a user on computer 724 creates a new file called file 4 (inode 104) in shard 1 in the local version B of the shared versioned file system managed by filer server 720. The new manifest of shard 1 in local version B includes inodes 101 (unmodified file 1 504-1), 102 (unmodified file 2 504-2), 103 (unmodified file 3 504-3), and 104 (new file 4). The new manifest indicates that inodes 101-103 were each created in version 1 of shard 1 while inode 104 was created in version 2 of shard 1. The new manifest also includes a flag in the "on" state to indicate that version 2 of shard 1 contains at least one update. By comparing the present version of shard 1 (version 2) with the version number in which each inode was created (inode 101 (created in version 1), 102 (created in version 2), 103 (created in version 1), and 104 (created in version 2), the filer server 720 can determine that inode 104 is new in version 2 of shard 1 while inodes 101-103 are not new.

Figure 8:
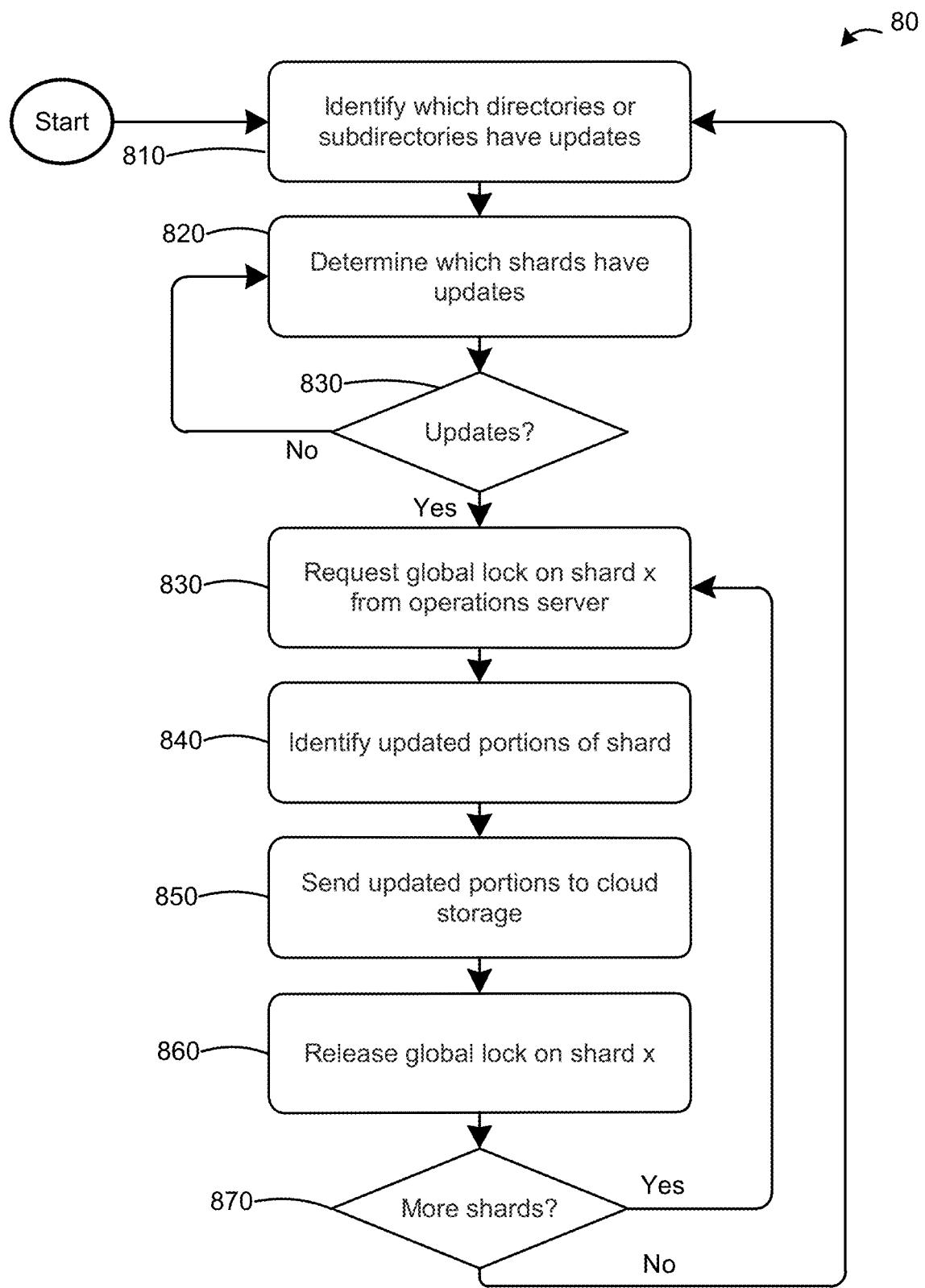
FIG. 8 is a flow chart of a method for sending updated data to cloud storage according to an embodiment.

FIG. 8 is a flow chart 80 of a method for sending updated data to cloud storage according to an embodiment. Using the above example of creating a modified file 2*504-2 in shard 1, in step 810 filer server 710 determines which directories or sub-directories have the updated flag flipped to the "on" state in local version A of the shared versioned file system 730. In the example of FIGS. 5 and 6, sub-directory 2-1 502 is the only directory or sub-directory in which the updated flag is flipped on. In step 820, filer server 710 determines which shards within the updated directories/sub-directories identified in step 810 have the updated flag flipped to the on state. In the above example, shard 1 503-1 is the only shard in sub-directory 2-1 503-1 in which the updated flag is on. Since filer server 710 has at least one updated shard, the flow chart 80 proceeds to step 830. In the circumstance when there are no updated shards, the filer server would return to step 810. The filer server can wait for a short time period (e.g., 30 seconds to 1 minute) before returning to step 810.

In step 830, filer server 710 sends a request to operations server 700 for a global lock on shard 1 503-1. If a global lock is available and not in use by another interface or filer server, operations server 700 returns the global lock to Filer A 710. If the global lock is not available, operations server 700 returns a message to the filer server to indicate that the global lock is unavailable. In that case, the filer server 710 can request a global lock for another updated shard and request the global lock on shard 1 503-1 later. Alternatively, the filer server 710 can continue to request the global lock on shard 1 503-1 until the operations server 700 is able to provide it. The operations server 700 can provide the global lock by sending a message to Filer A that indicates that the global lock request is granted. The operations server 700 also updates a global lock table, a database, or a memory location to indicate that the global lock for shard 1 503-1 is not available and, optionally, to indicate which filer server has the global lock. The operations server 700 can query the global lock table/database/memory location for a given shard to determine if a global lock for that shard is available prior granting a global lock request from a filer server.

After filer server 710 receives the global lock, the flow chart 80 proceeds to step 840 in which case the filer server 710 identifies the portions of shard 1 503-1 that have updated information. This can be a query for the state of each shard directory entry in the cache of filer server 710 as described below. The available states are cache entry dirty (i.e., the shard directory entry contains updated information since the last shard version), cache entry clean (i.e., the shard directory entry does not contain updated information since the last shard version), or cache entry created (i.e., the shard directory entry did not exist in the last shard version; it was created in the present shard version). The shard directory entries of dirty and created contain new information and need to be sent to the cloud/data store. The shard directory entries of clean already exist in that form in the cloud/data store so the filer server does not need to send the clean entries to the cloud/data store. For each dirty entry, the filer server determines the portions of the directory entry (e.g., a chunk and/or a manifest of a file) that have been updated. In the example of FIGS. 5 and 6, the filer server 710 determines from the updated flags of files 1-3 (504-1 to 504-3) that file 2 504-2 is updated while file 1 504-1 and file 3 504-3 have not been updated. The filer server 710 then evaluates the manifest 550 of file 2 version 2 and determines the file version 2 includes chunk **1\*505-1 and pointers to chunk 2 505-2 and chunk 3 505-3. Based on this information, the filer server 710 determines that chunk 1\*505-1 is new/updated and chunks 2 505-2 and 3 505-3** are not new.

Data is stored in cloud storage 750 by inode number and version number. For example, the contents of shard 1 503-1 in sub-directory 2-1 502 can be stored in the cloud at inodes/10/S1/ now where "10" corresponds to the inode number for sub-directory 2-1 502, "S1" corresponds to shard 1 in inode 10 (sub-directory 2-1 502), and "now" is a pointer to the most recent version of shard 1. For example, if the most recent version of shard 1 is version 1 (i.e., now=1), the pointer is to inodes/10/S1/v1. The directory inodes/10/S1/v1 includes pointers to the contents of shard 1 (i.e., inode 101 (file 1 504-1), inode 102 (file 2 504-2), and inode **1\*\*(file n 504-n)). The pointer to each inode (file) is to the latest version of the inode (file). For example, inode 102 (file 2 504-2) includes a pointer to inodes/102/ now. As before, "now" is a pointer to the most recent version, which in this case is the most recent version of inode 102. For example, if the most recent version of file 2 is version 3 (i.e., now=3), the pointer is to inodes/102/3. Continuing with the illustration of FIG. 5, the most recent version of file 2 includes a manifest 510 that identifies inode 1001 (chunk 1 505-1), inode 1002 (chunk 2 505-2), and inode 10\*\*(chunk n 505n) and the relationship between the chunks (e.g., offset) as the components that form file 2**.

Returning to the example above, in step 850 the filer server 710 sends the update portions of updated shard 1 to the cloud/data store. Filer server 710 can place a local lock on shard 1 during this step. First, filer server 710 creates a new version (version 2) on cloud storage for shard 1 503-1 at inodes/10/S1/v2. Version 2 of shard 1 includes a new manifest that identifies that the shard includes inodes 101-103 (corresponding to files 1-3). Since no files have been added or deleted from shard 1, the inodes identified in the manifest are the same in versions 1 and 2 of shard 1. However, the metadata for inode 102 indicates that inode 102 was created in version 1 of shard 1 and last updated in version 2 of shard 1. In contrast, the metadata for inodes 101 and 103 indicate that they were created in version 1 of shard 1 but have not been updated. Filer server 710 also updates the metadata for inodes/10/S1/ now to reference version 2 of shard 1 as the latest version (i.e., now=2).

To update the contents of inode 102 (file 2 504-2), filer server 710 creates a new version (version 2) at inodes/102/2. The most recent version of file 2 includes a new manifest 550 that identifies modified inode 1001 (chunk **1\*505-1) and pointers to unmodified inode 1002 (chunk 2 505-2) and unmodified inode 1003 (chunk 3 505-3) and the relationship between the chunks (e.g., offset) as the components that form version 2 of file 2 504-2. Filer A also updates the metadata for inodes/102/ now to reference version 2 of file 2 as the latest version (i.e., now=2). In addition, filer server 710 sends modified inode 1001 (chunk 1\*505-1) to the cloud/data store. When the update is complete, filer server 710 releases the global lock 860 on shard 1 503-1 back to operations server 700. The release of the global lock 860 can occur by filer server 710 sending a message to operations server 700 to indicate that global lock is released. Filer server 710 can also update an internal memory or cache to indicate (e.g., via a flag or bit) that the filer server 710 no longer has the global lock on shard 1 503-1. Filer server 710 also releases the local lock on shard 1 503-1 if such a lock was placed on shard 1 503-1. The release of the lock can occur by updating an internal memory or cache to indicate e.g., via a flag or bit) that the filer server 710 no longer has a local lock on shard 1 503-1. In step 870, the filer server 710 determines if there are any additional updated shards that need to be sent to the cloud/data store. If so, the flow chart 80 returns to step 830 where the filer server 710 requests a global lock on the next updated shard. If there are no additional updated shards to send to the cloud/data store, the flow chart 80 returns to step 810 to re-start the cloud update process. The filer server 710 can wait for a predetermined time period (e.g., 1 to 5 minutes) before re-starting the flow chart 80**.

As filer servers 710, 720 make updates to files and directories in the shared versioned file system, operations server 700 maintains a table 90 of such updates as illustrated in FIG. 9. Table 90 includes the updated inode and the updated shard within the updated inode for each update. Table 90 also includes an event number that operations server 700 assigns to each update. Table 90 illustrates that the event number increases by one integer value for each update, though the event number can increase by a different amount in some embodiments. For example, the event number can increase by multiple integers, a decimal (e.g., 100.1, 100.2, etc.), or other unit. The update to shard 1 of inode 10 (sub-directory 2-1 502) described above is included as event number 102 in table 90.

Filer servers 710, 720 query the operations server 700 periodically to determine whether there are any recent updates to the shared versioned file system as indicated by the event number. For example, filer server 720 last synchronized updates to the shared versioned file system at event number 100 as illustrated in FIG. 8. Since that time, there have been 5 updates to the shared versioned file system, as represented by event numbers 101-105. In order for filer server 720 to update its local version 740 of the global file system with the latest changes, filer server 720 retrieves and merges the updates represented by event numbers 101-105 into its local version 740 of the global file system.

Likewise, filer server 710 last synchronized updates to the shared versioned file system at event number 102, the same event that filer sever 710 updated shard 1 of inode 10 (sub-directory 2-1 502), as described above. To update its local version 730 of the global file system with the latest changes, filer server 710 retrieves and merges the updates represented by event numbers 103-105 into its local version 730 of the global file system.

Figure 10:
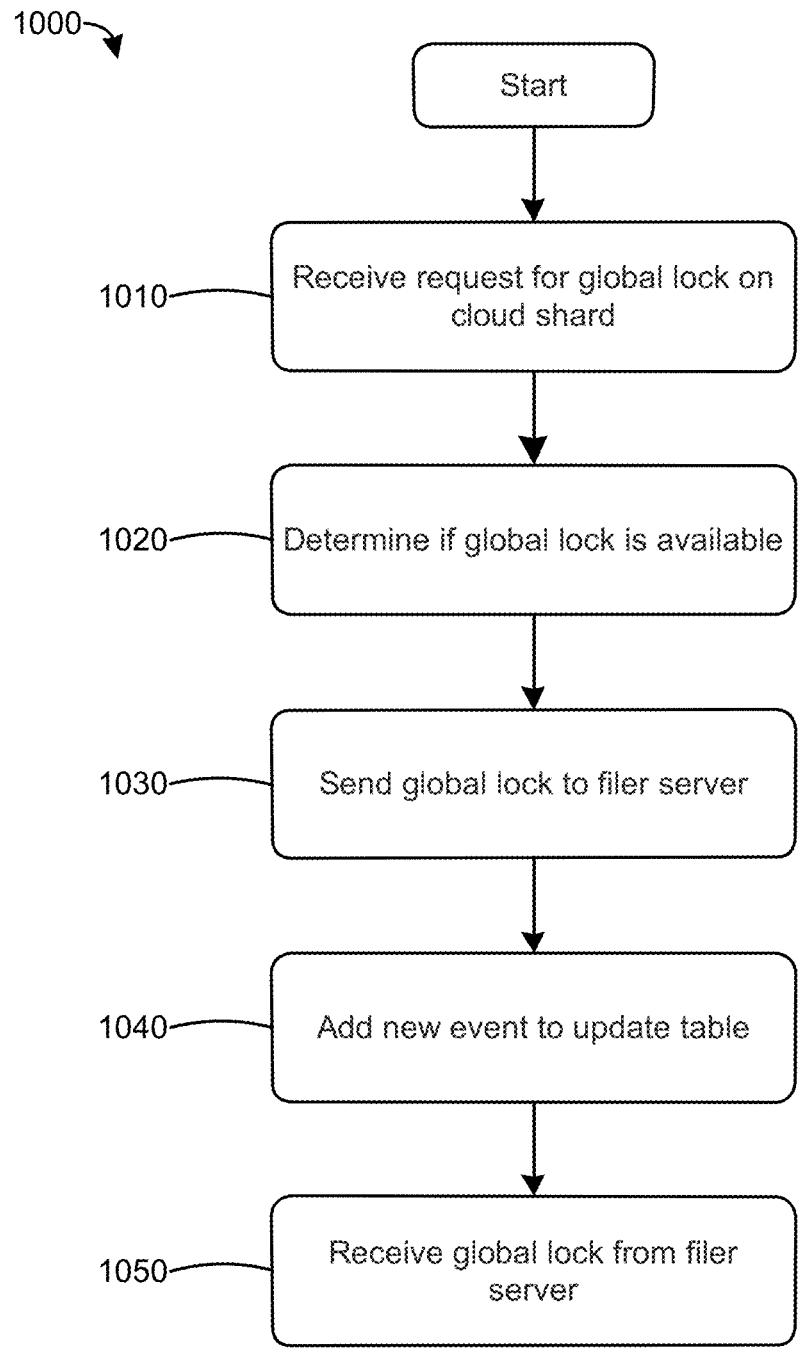
FIG. 10 is a flow chart of a method for synchronizing updates from a local version of a shared versioned file system to a cloud data store according to an embodiment.

FIG. 10 is a flow chart 1000 of a method for synchronizing updates from a local version of a shared versioned file system to a cloud data store according to an embodiment. In step 1010, the operations server receives a request for a global lock on a shard, such as shard 1 of inode 10. At step 1020, the operations server determines if the global lock is available for the requested shard. If the global lock is available and not in use by another filer server, the operations server sends the global lock to the requesting filer server in step 1030. If the global lock is not available, the operations server can continue to check if for the global lock in an available state. In addition or in the alternative, the operations server can respond to the filer server that the global lock is not available. The filer server can optionally repeat the request for the global lock on the requested shard.

After sending the global lock to the requesting filer server in step 1030, the operations server adds a new event to the update table in step 1040. The update table can be the same or substantially the same as the table illustrated in FIG. 9. In general, the update table is a list of each update to a shard in the cloud-based data store. Each update is assigned an event number. The update table can be used by the filer servers to synchronize updates from the cloud-based data store to their respective local versions of the shared versioned operating system. After the requesting filer server has pushed the update directory entries of the requested shard to the cloud-based data store, the operations server receives 1050 the global lock back from the requesting filer server.

Figure 11:
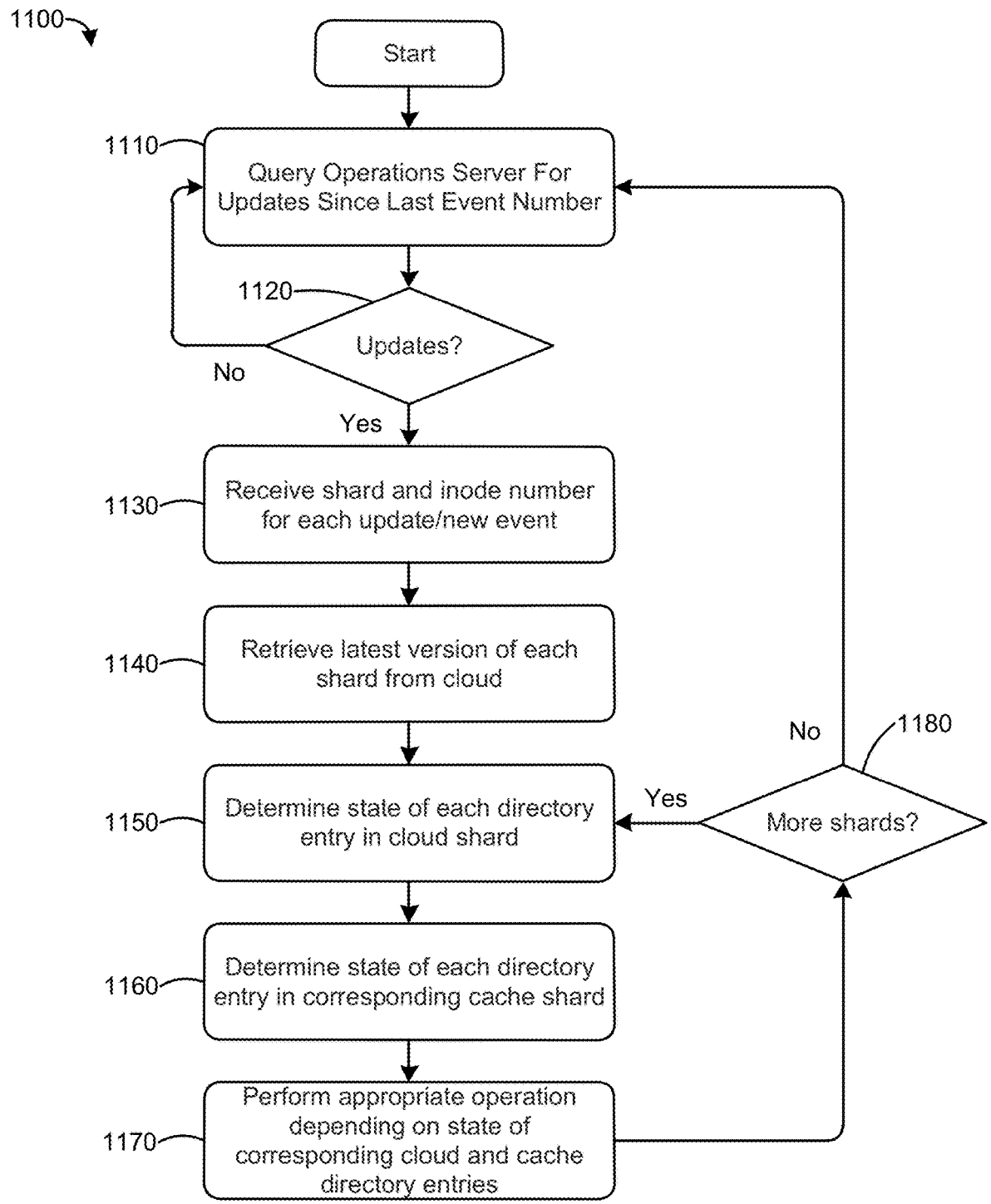
FIG. 11 is a flow chart of a method for synchronizing updates from a cloud-based shared versioned file system to a local version of same in an embodiment.

FIG. 11 is a flow chart 1100 of a method for synchronizing updates from a cloud-based a shared versioned file system to a local version of same according to an embodiment. In step 1110, the filer server queries the operating sever for a list of updates to the global file system that have occurred since the last event number updated to the file server. As an example with respect to FIG. 9, Filer 720 queries the operating server for a list of updates that have occurred since event 100, the last event number updated to file server 720. In the query, the file server can include the last event number updated to the file server in which case the operating server determines if the file server has the most recent updates by comparing the last event number updated to the file server with the most recent event number on the operations server. Alternatively, the file server can request the operations server for the most recent event number and the file server r can compare the last event number updated to the file server with the most recent event number on the operations server.

In step 1120, the file server or operations server determines if there are any new (unsynchronized) event numbers on the operations server. If the query in step 1010 includes the last event number updated to the file server, the operations server compares the last event number and the most recent event number to determine if there are any new events. Alternatively, if the file server requested the operations server for the most recent event number (and did not send the last event number in the query), the file server determines if there are any updates by comparing the most recent event on the operations server with the last event number updated to the file server, as discussed above. If there are new events, the file server requests the operations server to provide the inode number and shard number associated with each new event number.

If the result of step 1120 is that there are no new events since the last event number, the flow chart 1100 returns to step 1110. In some embodiments, the file server briefly pauses (e.g., for 30 seconds to 1 minute) before returning to step 1110.

If the result of step 1120 is that there are new events since the last event number, the flow chart 80 proceeds to step 1130. In step 1130, the file server receives, for each new event, the inode number and shard number associated with the new event. Using the example of FIGS. 6 and 7 above, the new event includes inode 10 (sub-directory 2-1 502) and shard 1 (e.g., in the form of /inode/10/s1).

In step 1140, the file server retrieves the latest version of each shard received from the operations server in step 1130. As discussed above, each shard includes a manifest of its shard directory entries (e.g., inodes corresponding to files) and metadata about each shard directory entry, such as the version of the shard in which it a file (inode) was created and the version of the shard in which the file (inode) was last updated. The file server uses this metadata in steps 1150 and 1160 to determine the state of each directory entry in the latest cloud version of the shard (step 1150) and the state of each directory entry in the cache version of the shard (step 1160). In step 1170, the file server performs the appropriate operation on each cache directory entry according to the table below. In step 1180, the file server determines if there are any additional updated shards received from the operations server that have not been processed. If so, the file server returns to step 1150 to determine the state of each directory entry in the next unprocessed shard. This loop continues until all updated shards received from the operations server have been processed. After all updated shards received from the operations server have been processed, the filer server in step 1180 returns to step 1110 to query the operation server for updates since the last event number. In this case, the last event number updated to the filer server would be the last event number from step 1130 in the last iteration through flow chart 1100.

The state of a given entry in a cloud shard version can be determined as follows.

If the version number in which a directory entry (e.g., File 1) in cloud shard 1 (a representative shard number) was last modified is the same as the latest version number of cloud shard 1, this indicates that File 1 was updated or modified (in general, "dirtied") in the latest version of cloud shard 1. In other words, the new event for shard 1 was due, at least in part, to an update or modification to File 1. As a shorthand, this state is referred to as "cloud entry dirty."

If the version number in which File 1 in cloud shard 1 was last modified is the less than the latest version number of cloud shard 1, this indicates that File 1 was not updated or modified in the latest version of cloud shard 1. In other words, the new event for shard 1 was not due to File 1. As a shorthand, this state is referred to as "cloud entry clean."

If the version number in which File 1 in cloud shard 1 was created is the same as the latest version number of cloud shard 1, this indicates that File 1 was created in the latest version of cloud shard 1. In other words, the new event for shard 1 was due, at least in part, to the creation of File 1. As a shorthand, this state is referred to as "cloud entry created."

If File 1 is not found in the latest version of cloud shard 1, this indicates that File 1 does not exist in that version. For example, this would occur if a user deleted File 1 and the filer server pushed cache shard 1 with the deleted file to the cloud. As a shorthand, this state is referred to as "cloud entry not found."

The state of a given entry in a cache shard version can be determined as follows.

If the version number in which File 1 in cache shard 1 was last modified is different than the latest version number of cache shard 1, this indicates that File 1 has been updated or modified (in general, "dirtied") since the filer server retrieved the latest cloud shard version from the cloud and merged it into local cache. In other words, cache shard 1 includes at least one modified directory entry that needs to be pushed to the cloud, at which point a new event number will be created at the operations server. As a shorthand, this state is referred to as "cache entry dirty."

If the version number in which File 1 in cache shard 1 was last modified is the same as the latest version number of cache shard 1, this indicates that File 1 has been not been updated or modified since the filer server retrieved the latest cloud shard version from the cloud and merged it into local cache. As a shorthand, this state is referred to as "cache entry clean."

If the version number in which File 1 in cache shard 1 was created is different than the latest version number of cache shard 1, this indicates that File 1 was created since the filer server retrieved the latest cloud shard version from the cloud and merged it into local cache. As a shorthand, this state is referred to as "cache entry created."

If File 1 is not found in the latest version of cache shard 1, this indicates that File 1 does not exist in that version. For example, this would occur if a user deleted File 1 after the filer server retrieved the latest cloud shard version from the cloud and merged it into local cache. As a shorthand, this state is referred to as "cache entry not found."

The filer server performs different operations depending on the state of a directory entry (e.g., File 1) in the cloud shard and in the cache shard. These operations are summarized in Table 1 in FIG. 15. The description below continues to use File 1 and shard 1 as a representative directory entry and shard for discussion purposes.

Figure 15:
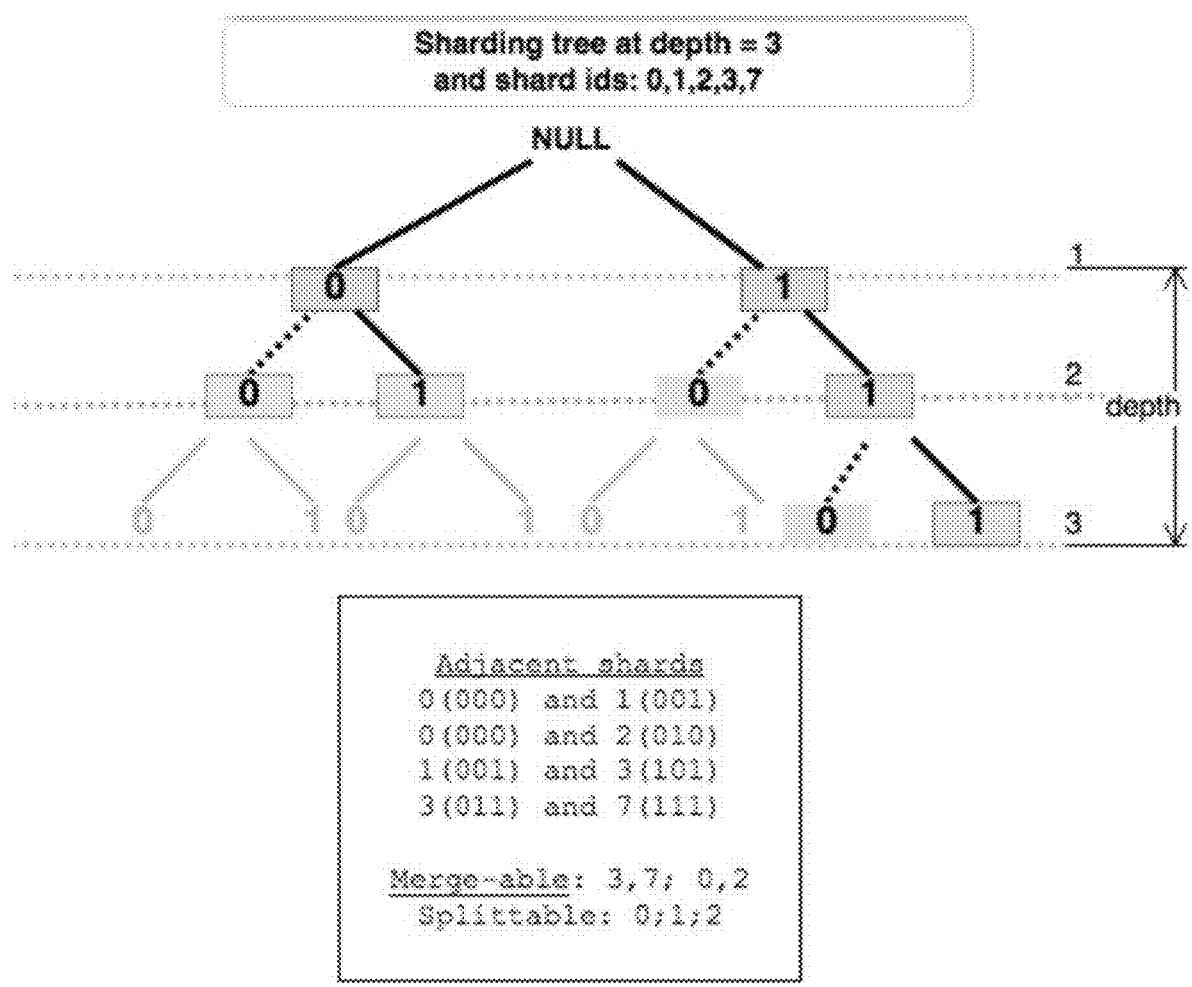
FIG. 15 depicts a representative sharding tree.

As depicted in the Table in FIG. 15, if the state of File 1 is created in cloud shard 1 and it is clean in cache shard 1, the filer server determines it is not an applicable state and returns an error. This is indicative of a coding error as such a combination is not possible.

If the state of File 1 is created in cloud shard 1 and it is dirty in cache shard 1, the filer server determines that there is a conflict. When a conflict occurs, the filer server saves the conflicted File 1 in cache shard 1 to the cloud and changes the file name to indicate that it is a conflicted file (e.g., File 1_conflicted).

If the state of File 1 is created in cloud shard 1 and it is not found in cache shard 1, the filer server creates a copy of File 1 in a new version of cache shard 1.

If the state of File 1 is created in cloud shard 1 and it is also created in cache shard 1, the filer server determines that there is a conflict. This scenario could occur if users associated with different filer server create a file with the same name in the same directory (shard). In a conflict state, the filer server saves conflicted version of File 1 from cache shard 1 to the cloud and changes its file name to indicate that it is a conflicted file, as described above.

If the state of File 1 is dirty in cloud shard 1 and it is clean in cache shard 1, the filer server merges the updates from the cloud version of File 1 into the cache version of File 1, as discussed herein. This scenario could occur if a user associated with filer server A makes an update to File 1 and sends that update to the cloud while filer server B has a clean copy in cache of the prior version of File 1. Thus filer server B has an old version of File 1 and needs to synchronize with the cloud to obtain the updates to File 1.

If the state of File 1 is dirty in cloud shard 1 and it is dirty in cache shard 1, the filer server determines that there is a conflict and proceeds as described above. This scenario could occur if two users make an update to the same version of File 1 close in time to one another. For example, a user associated with filer server A makes an update to File 1 and sends that update to the cloud while a second user associated with filer server B also makes an update to the same version of File 1, but has not yet pushed that update to the cloud.

If the state of File 1 is dirty in cloud shard 1 and it is not found in cache shard 1, the filer server determines it is not an applicable state and returns an error. This is indicative of a coding error as such a combination is not possible.

If the state of File 1 is dirty in cloud shard 1 and it is created in cache shard 1, the filer server determines that there is a conflict. This scenario could occur if a user associated with filer server A makes an update to File 1, which already exists in the cloud while a user associated with filer server B deletes File 1 and then creates a new File 1. The filer server saves conflicted cache version of File 1 in shard 1 to the cloud and changes its file name to indicate that it is a conflicted file, as described above.

If the state of File 1 is clean in cloud shard 1 and it is clean in cache shard 1, the filer server keeps the cache version of File 1 since there have been no changes to the file.

If the state of File 1 is clean in cloud shard 1 and it is dirty in cache shard 1, the filer server keeps the cache version of File 1. The filer server will merge the updates to File 1 the next time that the filer server pushes its updates or snapshot to the cloud. This scenario could occur if the filer server has a modified version of File 1 in cache but has not yet pushed the new version of File 1 to the cloud.

If the state of File 1 is clean in cloud shard 1 and it is not found in cache shard 1, the filer server determines it is not an applicable state and returns an error. This is indicative of a coding error as such a combination is not possible.

If the state of File 1 is clean in cloud shard 1 and it is created in cache shard 1, the filer server keeps the cache version of File 1. The filer server will merge the updates to File 1 the next time that the filer server pushes its updates or snapshot to the cloud.

If the state of File 1 is not found in cloud shard 1 and it is clean in cache shard 1, the filer server deletes the cache version of File 1. This scenario could occur if a user has deleted File 1 and pushed that deletion to the cloud, but another user (associated with another filer server) has a prior version of shard 1 in which File 1 is clean.

If the state of File 1 is not found in cloud shard 1 and it is dirty in cache shard 1, the filer server keeps the cache version of File 1. This scenario could occur if a user associated with filer server A deletes File 1 and pushes that update to the cloud while a user associated with filer server B updates File 1. The updated version of File 1 will be sent to the cloud the next time filer server B pushes its updates/snapshot to the cloud.

If the state of File 1 is not found in cloud shard 1 and it is created in cache shard 1, the filer server keeps the cache version of File 1. This scenario could occur if a user creates a file that does not yet exist in the cloud. File 1 will be sent to the cloud the next time the filer server pushes its updates/snapshot to the cloud.

FIG. 12 is a simplified illustration of a representative shard according to an embodiment. The representative shard in FIG. 12 is shard 1 (i.e., S1) of inode 1, which is illustrated in the format of /inodes/[inode number]/[shard number]/[shard version number]. Using this format, version 1 of shard 1 in inode 1 is represented as /inodes/1/S1/1. As described above, the latest version number of a shard or inode can be located in cloud storage by the version number "now." The "now" version subdirectory includes a pointer to the latest version, which in this case is version 1 (i.e., "latest"="1"). FIG. 12 illustrates the manifest 1200 of shard 1 version 1, which is written in XML (though other hierarchical coding languages can be used). The manifest identifies its inode and shard number using respective <inode> and <shard> tags. The manifest also includes a list of directory entries in shard 1 version 1. In this example, the only directory entry is for inode 100, which has the name of file1.txt. The manifest also indicates that inode 100 has a size of 1,024 bytes.

FIG. 13 is a simplified illustration of the representative shard from FIG. 12 after an update according to an embodiment. As illustrated in FIG. 13, the "latest" metadata has been updated with a pointer to version 2 of shard 1 of inode 1 (i.e., "latest"="2"). In manifest 1300 of shard 1 version 2, it is apparent that inode 101 (file 2.txt) has been added to shard 1. Inode 101 has a size of 2,048 bytes. Thus, manifest 1300 includes the directory entries of inode 100 (file1.txt) and inode 101 (file2.txt).

FIG. 14 is a simplified illustration of a representative directory entry in the representative shard of FIG. 13. The representative directory entry in FIG. 14 is inode 101, which corresponds to file2.txt as discussed above. The directory entry is illustrated in the format of /inodes/[inode number/[inode version number]. Using this format, version 1 of inode 101 is represented as /inodes/101/1. As described above, the latest version number of a shard or inode can be located in cloud storage by the version number "now." The "now" version subdirectory includes a pointer to the latest version, which in this case is version 1 (i.e., "latest"="1"). The manifest 1400 identifies its inode number and the chunks that form the inode. In this case, the manifest 1400 indicates that inode 101 is formed of chunks having a handle (or name) of c1 and c2. The manifest 1400 also includes metadata on the relationship between the chunks. In this case, manifest 1400 indicates that chunk c1 has an offset of 0 and a length of 1,024 bytes. Manifest 1400 also indicates that chunk c2 has an offset of 1,024 and a length of 1024 bytes. In other words, inode 101 has a total length of 2,048 bytes where chunk c1 precedes chunk c2.

Chunks c1 and c2 each refer to an object in the cloud object store. In particular, chunk c1 refers to the directory/chunks/c1/data which includes a pointer to the latest version of chunk c1, which in this case is version 1. Thus, version 1 of chunk 1 can be found at /chunks/c1/refs/100/1. Likewise chunk c2 refers to the directory/chunks/c2/data which includes a pointer to the latest version of chunk c2, which in this case is version 1. Thus, version 1 of chunk 2 can be found at /chunks/c2/refs/100/1.

Directory Sharding with Extendible Hashing

As described above and depicted in FIG. 5, typically sharding is implemented at with respect to a directory or sub-directory. In this approach, directory content is partitioned into a fixed (static) number of shards, typically based on a hash function. While sharding works well for its intended purpose, the approach may lack flexibility especially in the situation where there are directories with content(s) of varying sizes. In such circumstances (using static sharding) small directories (1-1000 entries) may suffer from excessive sharding leading to too many cloud objects, whereas large directories (100,000+ entries) may suffer from under-utilized sharding that does not provide appropriate benefits due to the high likelihood of having all shards dirty by the time a snapshot starts. According to this disclosure, "dynamic sharding"—whereby the number of shards is adjustable relative to directory content size—is implemented in a system such as described above. As will be described, the approach uses a variant of an extendible hashing algorithm to address this requirement.

By way of background, extendible hashing is a type of hash system which treats a hash as a bit string, and uses a digital (or "radix") tree for bucket lookup. A radix tree is an ordered tree data structure that is used to store a dynamic set or associative array where the keys are usually strings. Unlike a binary search tree, no node in the tree stores the key associated with that node; instead, its position in the tree defines the key with which it is associated. All the descendants of a node have a common prefix of the string associated with that node, and the root is associated with the empty string. Values are not necessarily associated with every node. Rather, values tend only to be associated with leaves, and with some inner nodes that correspond to keys of interest. Because of the hierarchical nature of an extendible hashing system, re-hashing is an incremental operation (done one bucket at a time, as needed). This means that time-sensitive applications are less affected by table growth than by standard full-table rehashes.

Extendible hashing can be used to partition the content of a directory into shards (chunks/buckets/pieces) of predefined size based on the number of entries in the directory. In accordance with this disclosure, and unlike standard extendible hashing, a prefix tree of variable depths need not be maintained; rather, the approach herein implements a variant in which a maximally-extended (complete) radix tree per a configured maximum depth is utilized and on which a merge process may be implemented. This process produces a variable depth prefix tree by combining underweight shards, preferably based on per-shard counters. Shard information is represented by a list of shard counters for each of the leafs of the complete prefix tree. The per-shard counters are then used to reconstruct the variable depth prefix tree as needed. Changes to the shard counters and the structure of the prefix tree are then done by altering the shard counters, typically as a consequence of local file system operations that affect them. The approach is preferably implemented by storing a list of local shard counter differentials, which are applied to a preexisting list of total shard counters. Once the changes are applied, a new variable depth tree can be generated. This approach provides a mechanism to effectively split and merge leafs on the tree without having to perform a split operation. The difference between an original and an updated tree (in effect a split or merge operation) is then achieved by merging/compacting the compete tree.

Dynamic sharding according to this disclosure provides improved performance for snapshot and synchronization of directories irrespective of whether those directories include a very small or very large number of entries. Preferably, dynamic sharding is carried out upon every volume snapshot.

As depicted in FIG. 15, and by way of background, a sharding tree 1500 at depth=3 with shard IDs: 0, 1, 2, 3 and 7 is shown. In this tree, the following shards are adjacent to one another: 0 (000) and 1 (001), 0 (000) and 2 (010), 1 (001) and 3 (101), and 3 (011) and 7 (111). As will be described, shards 3 and 7, and shards 0 and 2, are capable of being merged (in other words, are merge-able), and shards 0, 1 and 2 are capable of being split (i.e., they are split-able). Shard ID generation preferably is done by selecting a number of bits from a numerical result of applying a hash function executed on a directory entry's (direntry) name. The number of bits selected is dependent on a sharding depth, which refers to the depth of branching of the sharding tree for a particular shard ID. Generalizing, the sharding tree is a bit-tree representation of a current list of shard IDs, and wherein common bit strings are depicted as a common path to the root of the tree. As noted, splitting shards increases depth, wherein merging shards decreases depth. The goal of splitting a shard is to reassign entries of one shard IDs to two separate shard IDs, preferably where the second shard ID has a bit-difference (from the original shard ID) only at a highest non-zero bit. The goal of merging shards is to re-assign the entries of two shard IDs into a common shard ID of lower depth. Typically, a shard split increases sharding tree depth from 2 to 3, and a shard merge decreases sharding tree depth from 3 to 2.

Shard splitting is not necessarily required to implement dynamic sharding according to this disclosure, as the local cache in the filer may be configured to operate on a maximum number of shards configured (as if the directory is large). Shard splitting typically requires shards to be maintained in cache.

Figure 16:
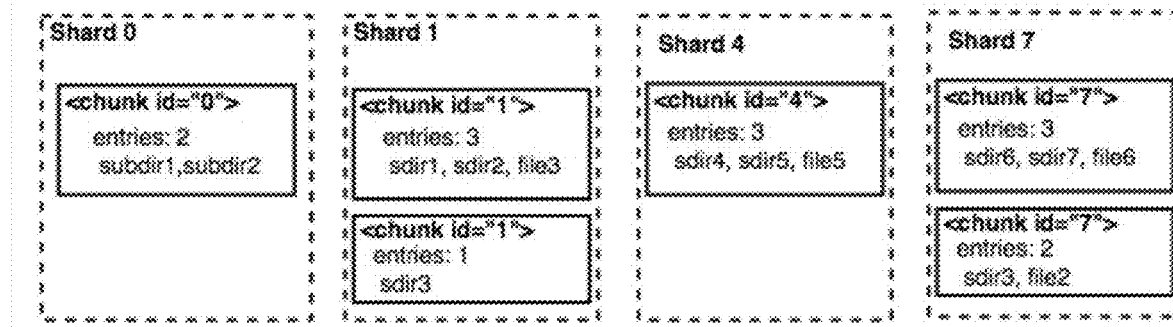
FIG. 16 depicts how shard counters may be implemented in accordance with an embodiment of this disclosure.

In the approach herein, preferably shard counters are used for the entries for each shard to facilitate generation of accurate dynamic shards. Shard counters preferably are stored in the directory manifest, both in their totality and as deltas for local changes in cache. FIG. 16 depicts representative shard counters 1600 in a directory manifest for the example scenario shown in FIG. 15. As depicted, a shard counter 1600 preferably is implemented as an XML element under the <manifest> element and contains a packed comma-separated list of counters per shard, with each counter indicating a total number of entries in the shard. Shard counters cannot be negative, and preferably the counters are reported for shards at a maximum depth (MAX_DEPTH). Manifest shard counter operations typically include a basic add function, and a subtract function. The shard counters in cache represents the changes per shard between snapshot (snap) and synchronization (sync) events for that directory. Preferably, the shard counters are stored in a uint32 array of size (MAX_SHARDS), and are persisted. Further, preferably there are four (4) states of the shard counter in cache: positive, negative, 0 (zero), unset (INT_MIN). Shards are marked as unprotected (dirty) by incrementing or decrementing a shard counter, or modifying a shard counter (set counter to 0 if unset).

In a preferred implementation approach, shard counters comprise an array of signed integers of size equal to a maximum number of shards supported. From this array, a dynamic shard list is generated, preferably by merging those shards that have an insufficient number of entries. To this end, a preferred shard merging algorithm starts as a defined maximum depth. For all shards, a processing loop starts at 0 to MAX_SHARDS-1. For each shard, the following processing is then carried out: if the shard has already been processed, skip the shard (and go to the next shard). If the shard has not already been processed, the routine gets the adjacent shard at depth (e.g., max shards 16→depth 4→0000 will have shard 1000 as adjacent). The routine then checks to determine if the sum of the counters for the two shards (the one being analyzed and its adjacent shard) is less than a maximum number of entries per chunk value. If so, the routine assigns the shard counters of the larger shard ID to the smaller shard ID and then deletes the adjacent shard (the shard with the larger ID) from the list. These latter operations then are repeated for depth−1 until depth=0.

The above-described shard merging algorithm is implemented in software (as a set of computer program instructions) executed by a processor.

The following provides additional implementation details and in particular changes to the system that are implemented to facilitate dynamic sharding as described herein. Typically, the local cache in a filer (e.g., FIG. 4) does not have awareness of the dynamic shard layout; rather, a particular file is only aware of the maximum number of shards configured for a volume. Therefore, typically all operations generate a shard ID based on this number. File system calls and related shard counter operations (whereby the shard ID is generated by hashing the entry name at maximum bit-depth) typically are as follows: mkdir, mknod, link, symlink—entry creation, increment the shard counter; rename—entry creation and deletion, decrement the shard counter at the source and increment the shard counter at the target; unlink, rmdir—entry deletion. Preferably, the filer maintains a version number when rename operations cross shards. This is used by the merge function to determine whether the shard counters need to be adjusted. Further, and with respect to backend operations, when parent directories are marked dirty via dirty to root, the corresponding shard for the filename has the shard counters modified, i.e., marked dirty without changing the counters. Further, the shard counters preferably are persisted for use when metadata snapshot(s) are taken.

Figure 17:
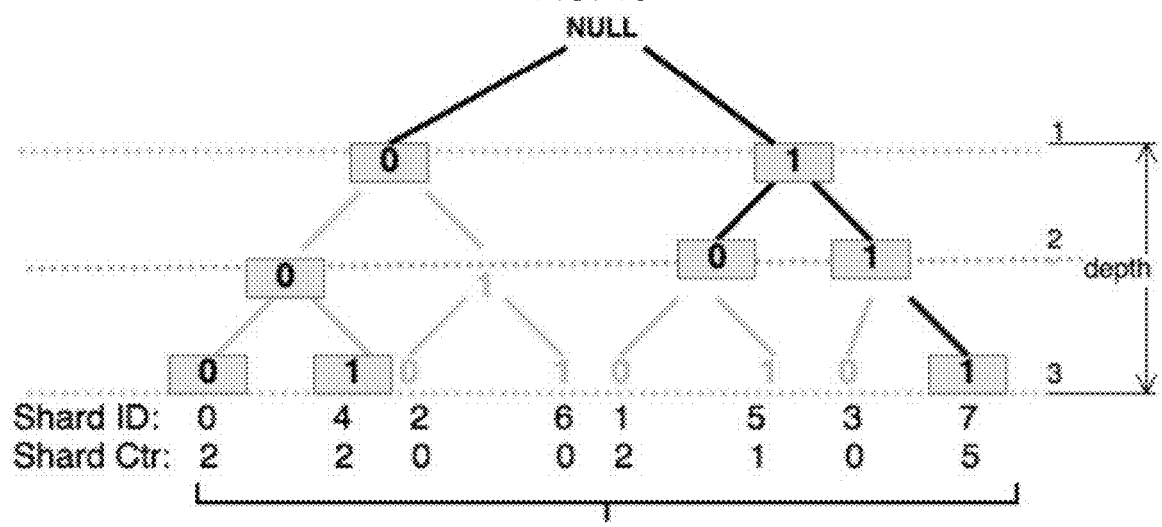
FIG. 17 depicts a tree that is processed according to a directory snap/push processing routine of this disclosure.
Figure 17:
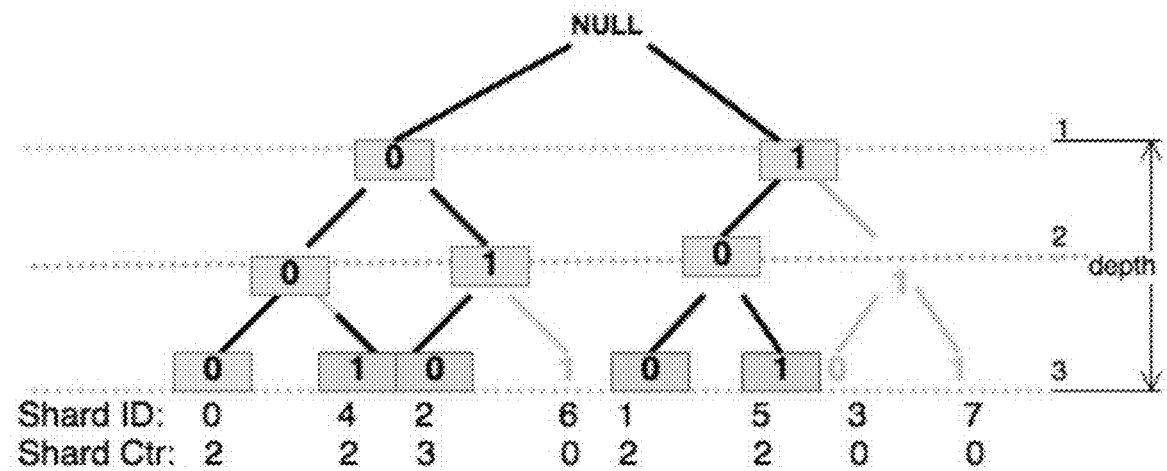

A preferred directory snap/push process is now described. The routine begins by retrieving the shard counters for a current version manifest (step (1)). A dynamic shards list is then created from the current counters, preferably by merging from shard counters (step (2)). The shard counter deltas are then applied to the shard counters of the current manifest (step (3)). The routine then continues by creating a dynamic shards list from the new counters, preferably by merging from the shard counters (step (4)). The routine then processes all entries for which a shard ID is considered dirty relative to the newly-generated dynamic shards (step (5)). According to this aspect, the following conditions are required for a clean shard: the shard ID of the current manifest dynamic shard ID matches the new manifest dynamic shard ID, the depth of the current manifest dynamic shard ID matches the depth of the new manifest dynamic shard ID, and the shard ID is not marked dirty in a shard mask produced by the shard counters. FIG. 17 depicts the sharding tree for the example directory snapshot before and after the above-described process is carried out.

In particular, FIG. 17 depicts the sharding tree with shard IDs=0, 1, 4, 7 and with the maximum entries per chunk=3. As depicted, in this example the current manifest shard counters are obtained at step (1), namely: {000:2, 001:2, 010:0, 011:0, 100:3, 101:1 and 111:5}. The dynamic shards list (step (2)) after merge are then: {000:2, 001:3, 100:3 and 111:5}. In this example, the filer shard counter deltas (step (3)) are: {000:IN MIN, 001:INT MINT, 010: +3, 011: INT_MIN, 100:0, 101: +1, 110: INT_MIN, 111: −5}. After applying the deltas, the manifest shard counters are then: {000:2, 001:2, 010:3, 011:0 100:3, 101:2, 110:0 and 111:0}. The dynamic shards list created from the new counters (step (4)) is then: {000:2, 001:2, 010:3, 100:3 and 101:2}. Given the conditions noted for a clean shard, in this example the dirty shards are: {001, 010, 100, 101}.

Figure 18:
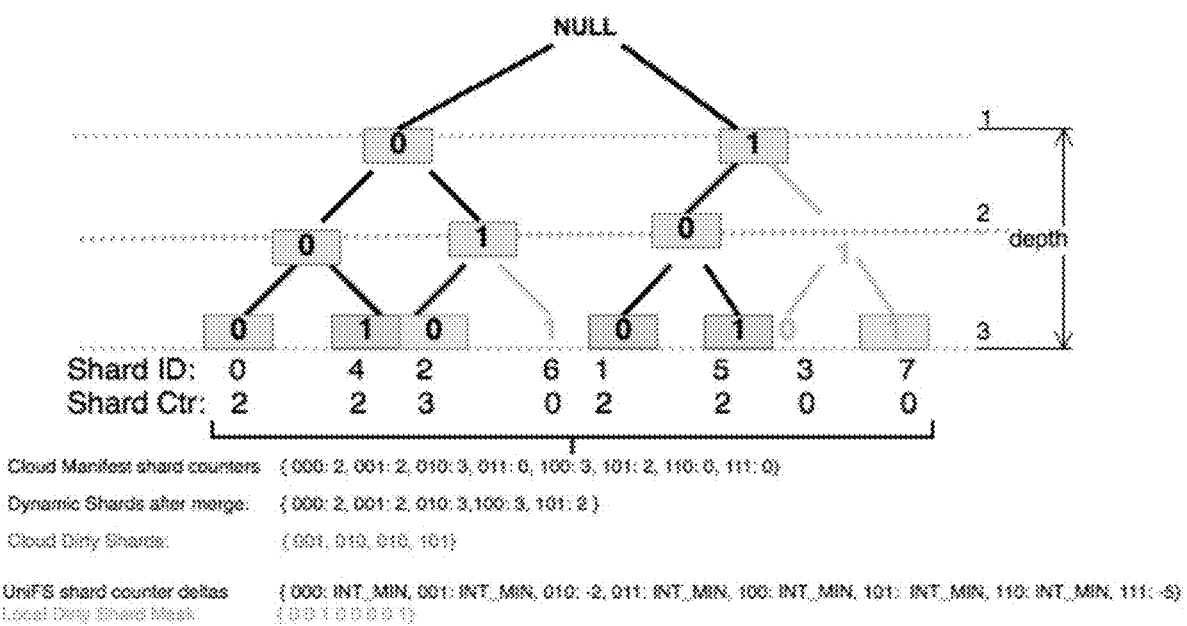
FIG. 18 depicts a tree that is processed according to a directory sync/merge processing routine of this disclosure.

A preferred directory sync/merge process is now described. The merge process typically requires two sets of directory entries as candidates for merge, one that is locally present, and one from the merging cloud manifest for that directory. Preferably, the routine skips uninteresting (clean) entries for enhanced performance. The process begins by retrieving shard counters from the directory manifest to be merged (step (1)). Taking only chunks associated with shard IDs considered to be cloud-dirty (defined as chunks with "created" version from a list of versions in a current merging TOC), the routine then performs the merge (step (2)). Local entries that are considered clean preferably are skipped from the list of local merge candidates (step (3)). Preferably, a local clean name is any name that is both no in a shard ID that is dirty in a local shard mask (made by counters) and not part of a dynamic shard that is cloud dirty. The merge process may also implement several exceptions: if conflicts are to be generated, instantiation of new entries in the directory also have to increment the directory shard counter; if a deletion cannot be propagated due to a locally dirty entry, the shard counters should be adjusted when rename has not already reflected this state locally; further, if a deletion needs to be performed due to an expired GL entry as an already renamed filename. FIG. 18 depicts an example of the merge operation with respect to a sharding tree.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein. The present materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

What is claimed is:

1. A method of synchronizing updates to a shared versioned file system from a local filer server, the local filer server running a local version of the shared versioned file system, comprising:
    partitioning contents of a directory into a dynamic number of shards by applying an extendible hashing function that generates a maximally-extended radix tree per a configurable maximum depth, wherein a shard is a portion of a sub-directory of the directory, the portion being less than the sub-directory as a whole, the maximally-extended radix tree having a set of leaves, wherein the shards are of predefined size based on a number of entries in the directory, wherein information about the shards is represented by shard counters corresponding to leaves of the maximally-extended radix tree, and wherein a structure of the radix tree is adjusting by tracking the shard counters and selectively applying a list of shard counter differentials;
    receiving one or more requests from the local file server to update one of more of the shards in a cloud data store; and
    updating one or more shards in the cloud data store in response to receipt of the requests.

2. The method as described in claim 1 further including selectively using the shard counters to construct a variable depth prefix tree in response to a given occurrence at the local filer server.

3. The method as described in claim 2 wherein the given occurrence is a local file server operation.

4. The method as described in claim 3 wherein the structure of the radix tree is adjusted in response to the local file server operation.

5. The method as described in claim 4 wherein the structure of the radix tree is adjusted by merging two or more leaves.

6. The method as described in claim 5 wherein the two or more leaves are merged without requiring a split operation.

7. The method as described in claim 1 wherein a shard counter is maintained in a directory manifest.

8. The method as described in claim 1 wherein a request is associated with a snapshot operation.

9. The method as described in claim 1 further including compacting the radix tree to produce an updated radix tree.

* * * * *